United States Patent
Ellis et al.

(10) Patent No.: US 9,925,895 B2
(45) Date of Patent: Mar. 27, 2018

(54) PASSENGER SEAT WITH CLOSE-OUT SHROUD

(71) Applicant: Zodiac Seats US LLC, Gainesville, TX (US)

(72) Inventors: Clifton S. Ellis, Fort Worth, TX (US); David A. Acuna, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/101,033

(22) PCT Filed: Dec. 17, 2014

(86) PCT No.: PCT/US2014/070746
§ 371 (c)(1),
(2) Date: Jun. 2, 2016

(87) PCT Pub. No.: WO2015/095274
PCT Pub. Date: Jun. 25, 2015

(65) Prior Publication Data
US 2016/0304011 A1     Oct. 20, 2016

Related U.S. Application Data

(60) Provisional application No. 61/916,964, filed on Dec. 17, 2013.

(51) Int. Cl.
| | | |
|---|---|---|
| *B60N 2/46* | (2006.01) | |
| *B64D 11/06* | (2006.01) | |
| *A47C 31/00* | (2006.01) | |
| *B60N 2/24* | (2006.01) | |
| *B61D 33/00* | (2006.01) | |
| *B63B 29/04* | (2006.01) | |

(52) U.S. Cl.
CPC ............ B60N 2/4633 (2013.01); A47C 31/00 (2013.01); B60N 2/242 (2013.01); B60N 2/4606 (2013.01);
(Continued)

(58) Field of Classification Search
CPC .... B60N 2/4633; B60N 2/242; B60N 2/4606; B64D 11/0644; B64D 11/0606;
(Continued)

(56) References Cited

U.S. PATENT DOCUMENTS 6,776,455 B2 *  8/2004  Longtin ............... B60N 2/4606
                                                            297/115
7,287,817 B2 * 10/2007  Goldman ................. B60N 2/22
                                                            297/146
(Continued)

FOREIGN PATENT DOCUMENTS

| CN | 102933423 A | 2/2013 |
| CN | 104284836 A | 1/2015 |
| DE | 102012216739 A1 | 3/2013 |

OTHER PUBLICATIONS

"Design Issues on Living Hinges" http://web.mit.edu/2.75/resources/random/Living%20Hinge%20Design.pdf accessed Jul. 15, 2017.*
(Continued)

*Primary Examiner* — Philip F Gabler
(74) *Attorney, Agent, or Firm* — Kilpatrick Townsend & Stockton LLP; Dean W. Russell; Tiffany L. Williams

(57) ABSTRACT

Described are close-out shrouds (10) formed of a flame retardant material with at least one living hinge (16). The flame retardant material is configured to substantially enclose an articulating opening to a cavity, and the at least one living hinge is configured to articulate through greater than 50,000 cycles before failure.

19 Claims, 11 Drawing Sheets

(52) U.S. Cl.
CPC ............ *B61D 33/005* (2013.01); *B63B 29/04* (2013.01); *B64D 11/06* (2013.01); *B64D 11/0644* (2014.12); *A47C 31/001* (2013.01); *B63B 2029/043* (2013.01)

(58) Field of Classification Search
CPC ....... B64D 11/06; A47C 31/00; A47C 31/001; B61D 33/005; B63B 29/04; B63B 2029/043
See application file for complete search history.

(56) References Cited

U.S. PATENT DOCUMENTS

| | | | |
|---|---|---|---|
| 7,770,966 B2* | 8/2010 | Johnson | B60N 3/004 297/122 |
| 2010/0078437 A1 | 4/2010 | Valley, III et al. | |
| 2011/0272991 A1 | 11/2011 | Saxton | |
| 2011/0315701 A1* | 12/2011 | Everson | B65D 43/162 220/780 |
| 2013/0249257 A1 | 9/2013 | Suhre et al. | |

OTHER PUBLICATIONS

International Patent Application No. PCT/US2014/070746 Search Report and Written Opinion dated Apr. 7, 2015.
International Application No. PCT/US2014/070746, International Preliminary Report on Patentability, dated Jun. 30, 2016.
Chinese Patent Application No. 201480068633.4, Office Action and Search Report (and translation) dated May 27, 2017.

* cited by examiner

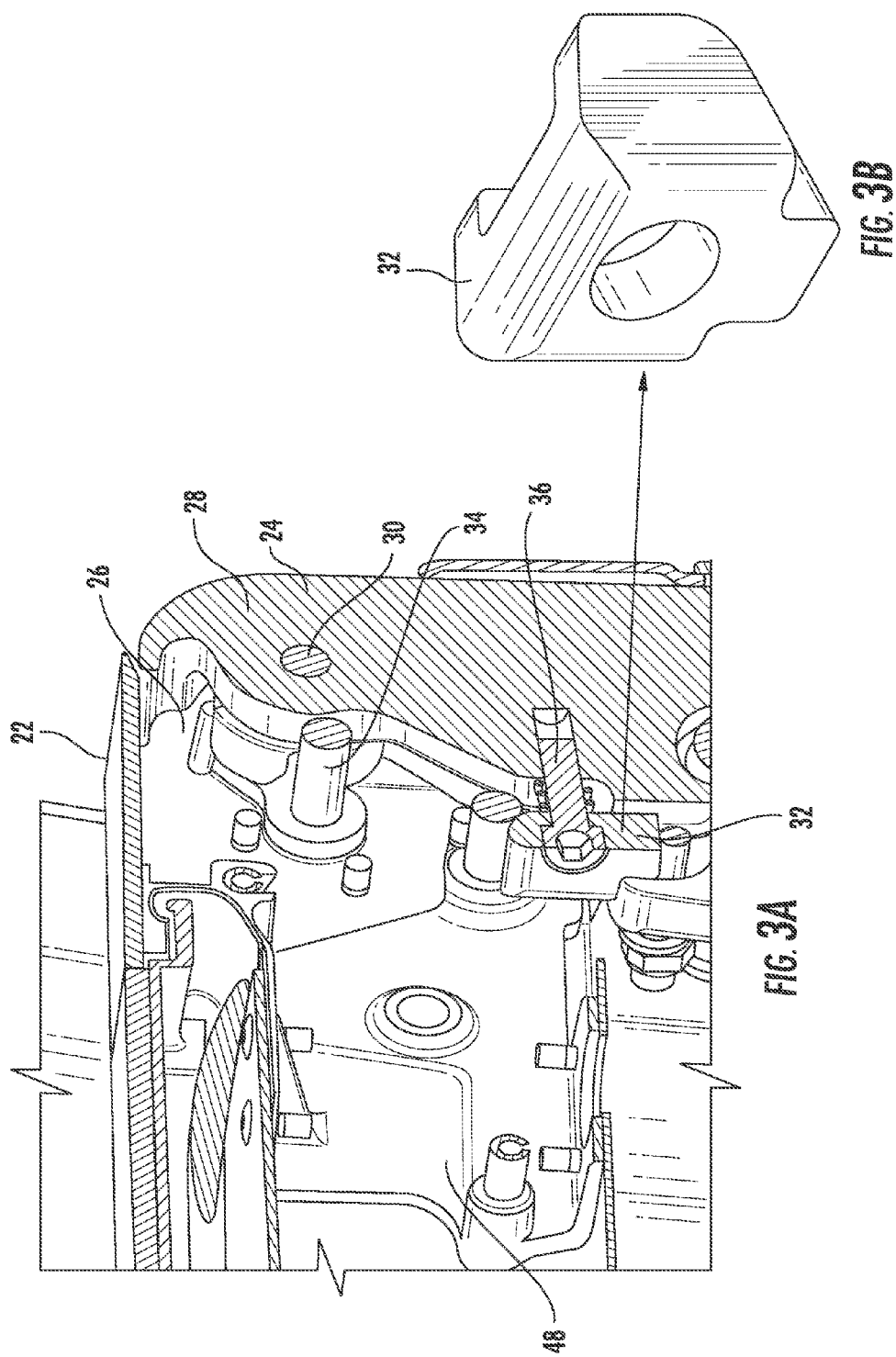

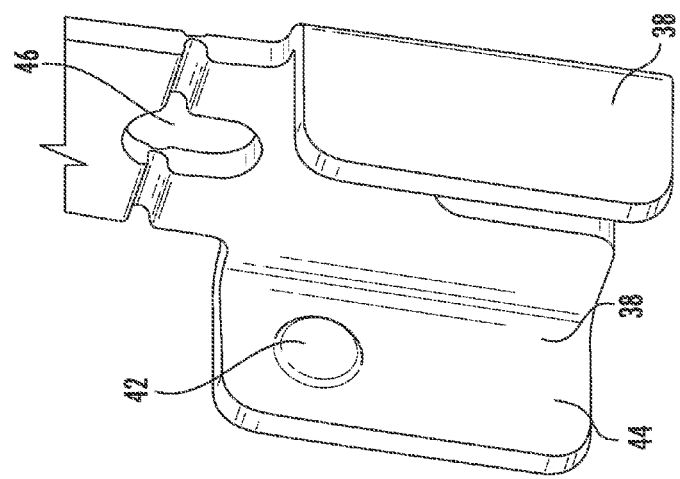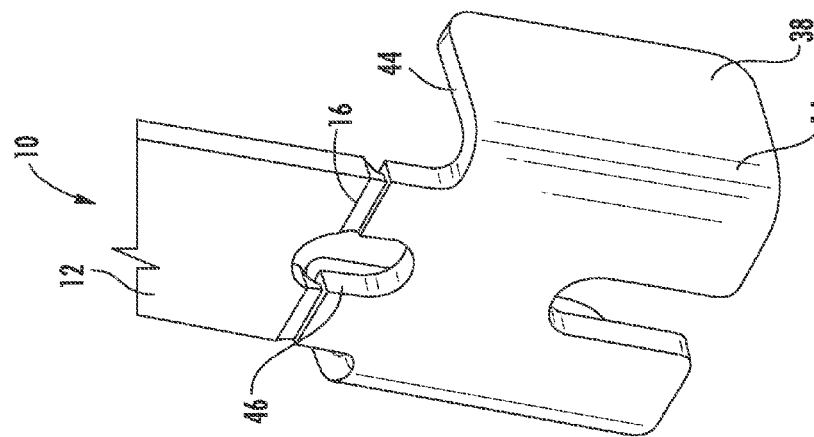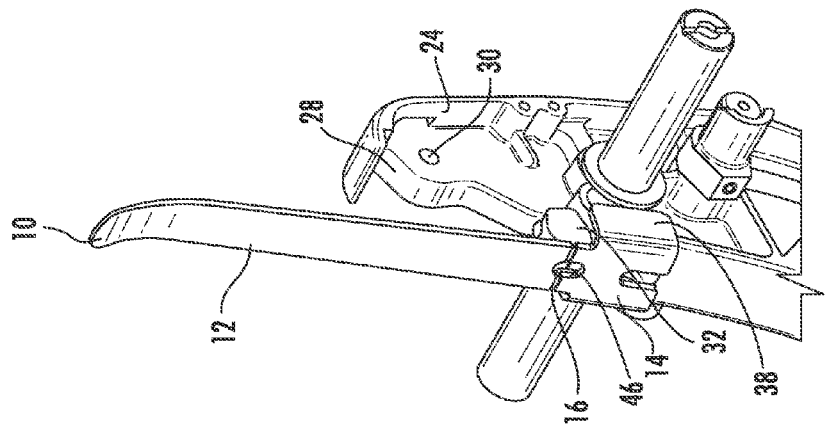

PASSENGER SEAT WITH CLOSE-OUT SHROUD

CROSS REFERENCE TO RELATED APPLICATIONS

This application is the U.S. national phase entry of International Patent Application Serial No. PCT/US2014/070746 ("the '746 application"), filed on Dec. 17, 2014, which application is related to and claims priority benefits from U.S. Provisional Application Ser. No. 61/916,964 ("the '964 application"), filed on Dec. 17, 2013, entitled ADAPTABLE POSITION SAFETY CLOSE-OUT SHROUD, the entire contents of each of the '746 and '964 applications is incorporated herein by this reference.

FIELD OF THE INVENTION

The present invention relates to a close-out shroud for a passenger seat, which prevents access to pinch points and is capable of adapting its shape to meet specific mechanical motions.

BACKGROUND

Passenger seats on common carriers (such as buses, trains, ships, and aircraft) often utilize arm rests, which are pivotally mounted to the passengers seats. The arm rests may be rotated aft into a substantially vertical (or stowed) positions, and rotated forward into substantially horizontal (or deployed) positions.

The height and angle of the deployed positions of the arm rests are typically adjusted by a positional cam mounted to a portion of the passenger seat frame or spreader, and a rigid pin mounted to the arm rest proximate the pivotal coupling point.

In the deployed position, the arm rest's pin rests directly on the positional cam, which supports the load from the arm rest itself, as well as a load exerted by a passenger seated in the passenger seat when the passenger utilizes the arm rest for support.

In these conventional designs, the rotation of the arm rest into the deployed position creates a pinch point between the pin and the cam. This pinch point poses a safety risk because a passenger could potentially insert his or her hands or other appendages between the positional cam and the pin, thereby risking bodily harm when the load from the arm rest and/or passenger is applied to the passenger's hand or other appendage.

In an effort to eliminate these potential risks, a close-out shroud is often added to prevent access to such cavities or voids, as illustrated in FIGS. 4A-4B and 5A-5C. As a result, the close-out shroud prevent passengers from being able to put any part of their body between the cam and the pin. These close-out shrouds are typically formed as a single piece of flexible plastic material, in which an upper portion of the close-out shroud travels with the arm rest and a lower portion remains fixed to the seat frame. As a result, the elastic properties of the plastic material allow the transition area of the close-out shroud that is positioned over the actual pivot location/pinch point to bend with when the arm rest is deployed and to straighten when the arm rest is stowed.

The choice of approved materials for these close-out shrouds have limited the options for creating close-out shrouds that can withstand the repeated use without failure. For example, federal aviation flame resistance requirements of 14 CFR 25.853 (a) (AMEND 25-83) require the use of flame retardant plastic materials, which are defined as materials that shall self-extinguish once ignited during vertical burn testing. Conventionally available flame retardant material choices typically have lower elasticity (i.e. are more brittle) and therefore are not robust enough to withstand the frequency with which the arm rests are raised and lowered over time. As a result, these conventional close-out shrouds often break after repeated use, which creates another potential safety hazard after the close-out shroud has broken and failed. For example, polycarbonate (a known flame retardant plastic material commonly used in aircraft seats) has been tried as a close-out shroud and failed due to its lack of fatigue resistance.

It is therefore desirable to develop a close-out shroud that will block access to cavities or voids formed by articulating components, while also having increased durability through additional engineering features and/or flame retardant material improvements so that that the close-out shroud is able to flexibly adapt its shape to meet specific mechanical motions over a greater number of cycles without breaking.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a close-out shroud comprises a flame retardant material with a fatigue resistance with a fatigue resistance that exceeds 50,000 cycles before failure, and at least one living hinge formed within the flame retardant material, wherein the at least one living hinge is configured to adapt a shape of the flame retardant material to an articulating opening of a cavity.

In some embodiments, the at least one living hinge may be formed as a thinned or cut section of the flame retardant material. In further embodiments, the flame retardant material is polypropylene or polyethylene and/or flame retardant material has a high melt flow rate greater than 2 g/10 min. The fatigue resistance exceeds 75,000 cycles before failure.

In certain embodiments, the flame retardant material may further comprise a plurality of living hinges and/or the flame retardant material may further comprise a pair of prongs with snap-fit hooks to couple the flame retardant material to a structure proximate the articulating opening of the cavity.

In some embodiments, the cavity is positioned between an arm rest pivot pin and an adjustable cam.

According to certain embodiments of the present invention, a close-out shroud comprises a flame retardant material comprising at least one living hinge, wherein the flame retardant material is configured to substantially enclose an articulating opening to a cavity, and the at least one living hinge is configured to articulate through greater than 50,000 cycles before failure.

In some embodiments, the at least one living hinge may be formed as a thinned or cut section of the flame retardant material. In further embodiments, the flame retardant material is polypropylene or polyethylene and/or the flame retardant material has a high melt flow rate greater than 2 g/10 min.

In certain embodiments, flame retardant material may further comprise a plurality of living hinges and/or the flame retardant material may further comprise a pair of prongs with snap-fit hooks to couple the flame retardant material to a structure proximate the articulating opening of the cavity.

In some embodiments, the cavity is positioned between an arm rest pivot pin and an adjustable cam.

According to certain embodiments of the present invention, a passenger seat comprises a spreader assembly comprising a cam, an arm rest assembly comprising an arm rest and a pivot pin, wherein the arm rest is pivotally coupled to the spreader assembly and configured to rotate between a stowed and a deployed position, wherein the pivot pin contacts the cam when the arm rest is in the deployed position, and a close-out shroud comprising an enclosure portion, a coupling portion, and at least one living hinge positioned between the enclosure portion and the coupling portion, wherein the coupling portion is coupled to the spreader assembly and the enclosure portion extends into the arm rest so that the at least one living hinge is configured to articulate with the pivotal movement of the arm rest so that the close-out shroud substantially encloses an articulating opening between the pivot pin and the cam.

In some embodiments, the at least one living hinge may be formed as a thinned or cut section of a flame retardant material forming both the enclosure portion and the coupling portion. In further embodiments, the flame retardant material is polypropylene or polyethylene. The at least one living hinge may be configured to articulate through greater than 50,000 cycles before failure.

In certain embodiments, the coupling portion comprises a pair of prongs with snap-fit hooks that couple the close-out shroud to the spreader assembly.

BRIEF DESCRIPTION OF THE DRAWINGS

In the following detailed description, embodiments of the invention are described referring to the following figures:

FIG. 3A is a cross-sectional perspective view of a pivotal coupling arrangement between the arm rest assembly of FIG. 2 and a spreader assembly of one of the passenger seats of FIG. 1.

FIG. 3B is a close-up perspective view of an adjustable cam used in the pivotal coupling arrangement of FIG. 3A.

FIG. 7A is another perspective view of the close-out shroud of FIG. 6 coupled to the spreader assembly of FIG. 3A, according to certain embodiments of the present invention.

FIG. 7B is a close-up exterior perspective view of the close-out shroud of FIG. 6, according to certain embodiments of the present invention.

FIG. 7C is a close-up interior perspective view of the close-out shroud of FIG. 6, according to certain embodiments of the present invention.

DETAILED DESCRIPTION

Figure 1:
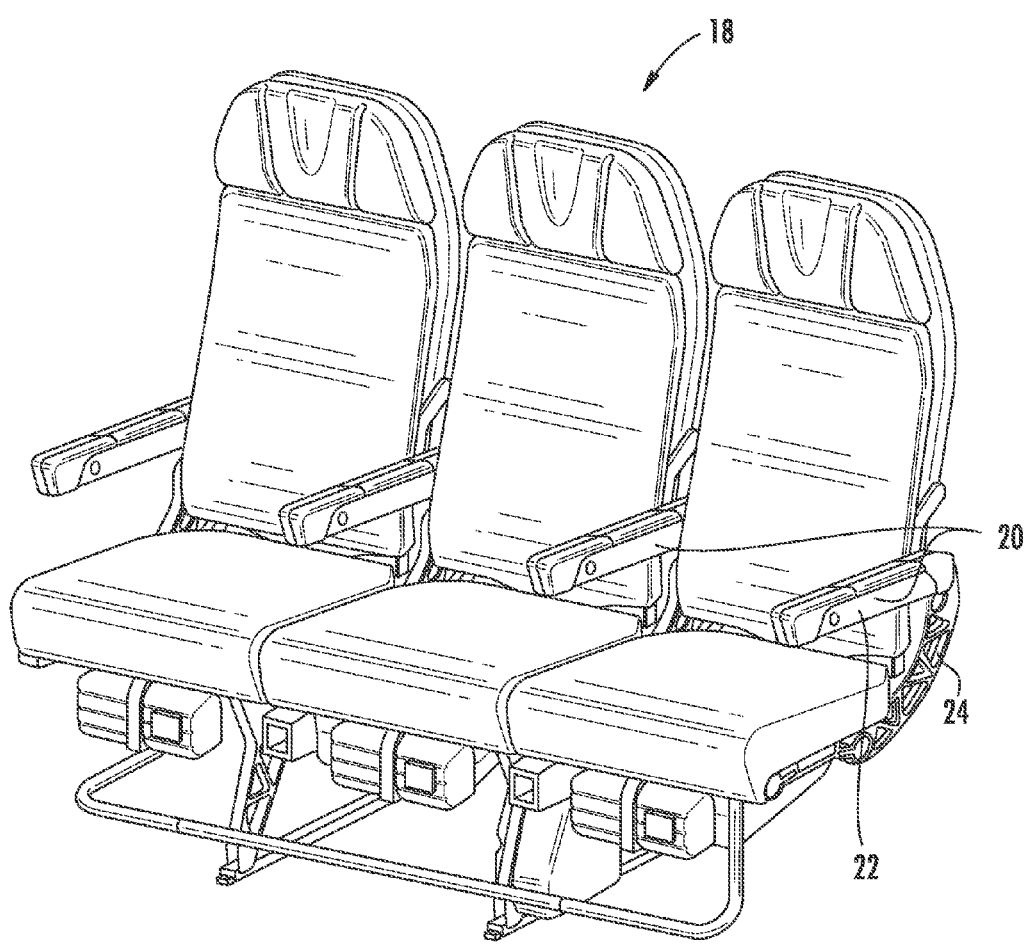
FIG. 1 is a perspective view of a plurality of passenger seats.
Figure 2:
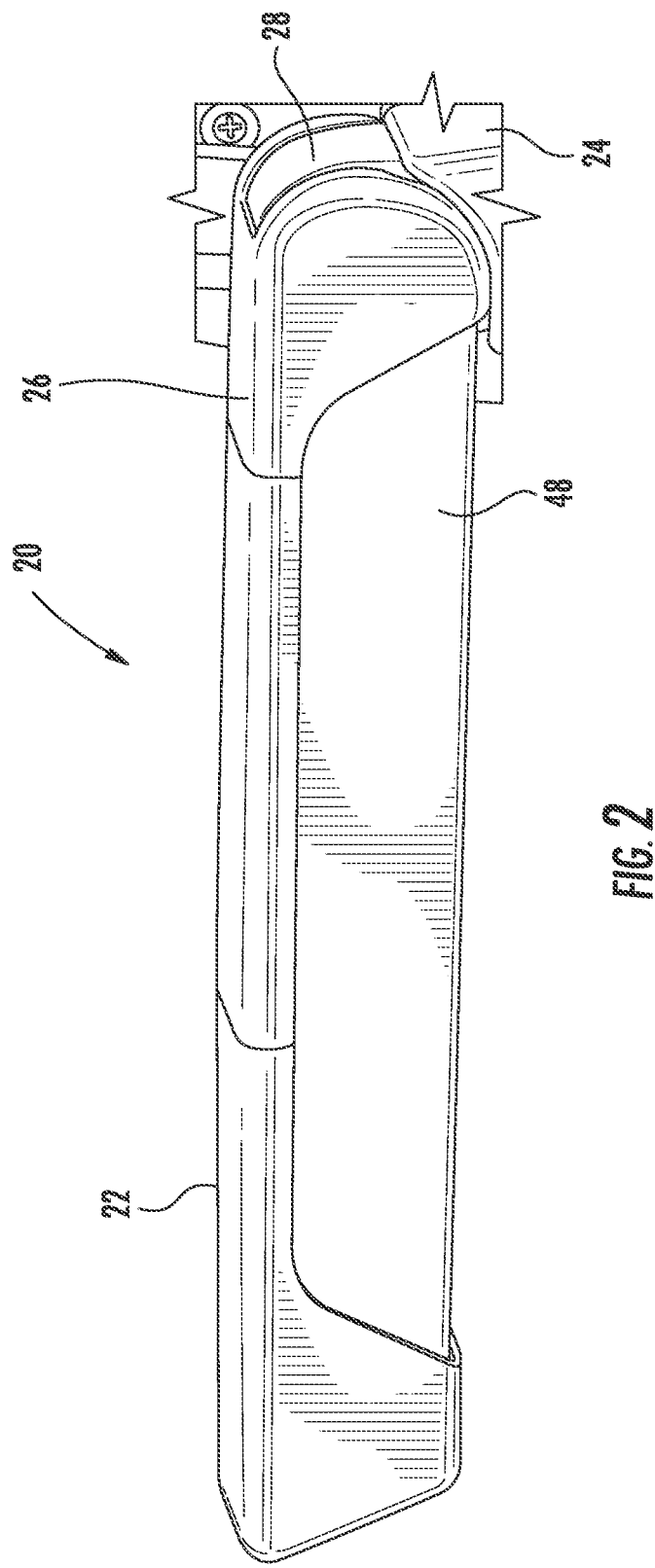
FIG. 2 is a perspective view of an arm rest assembly of one of the passenger seats of FIG. 1.
Figures 4A, 4B:
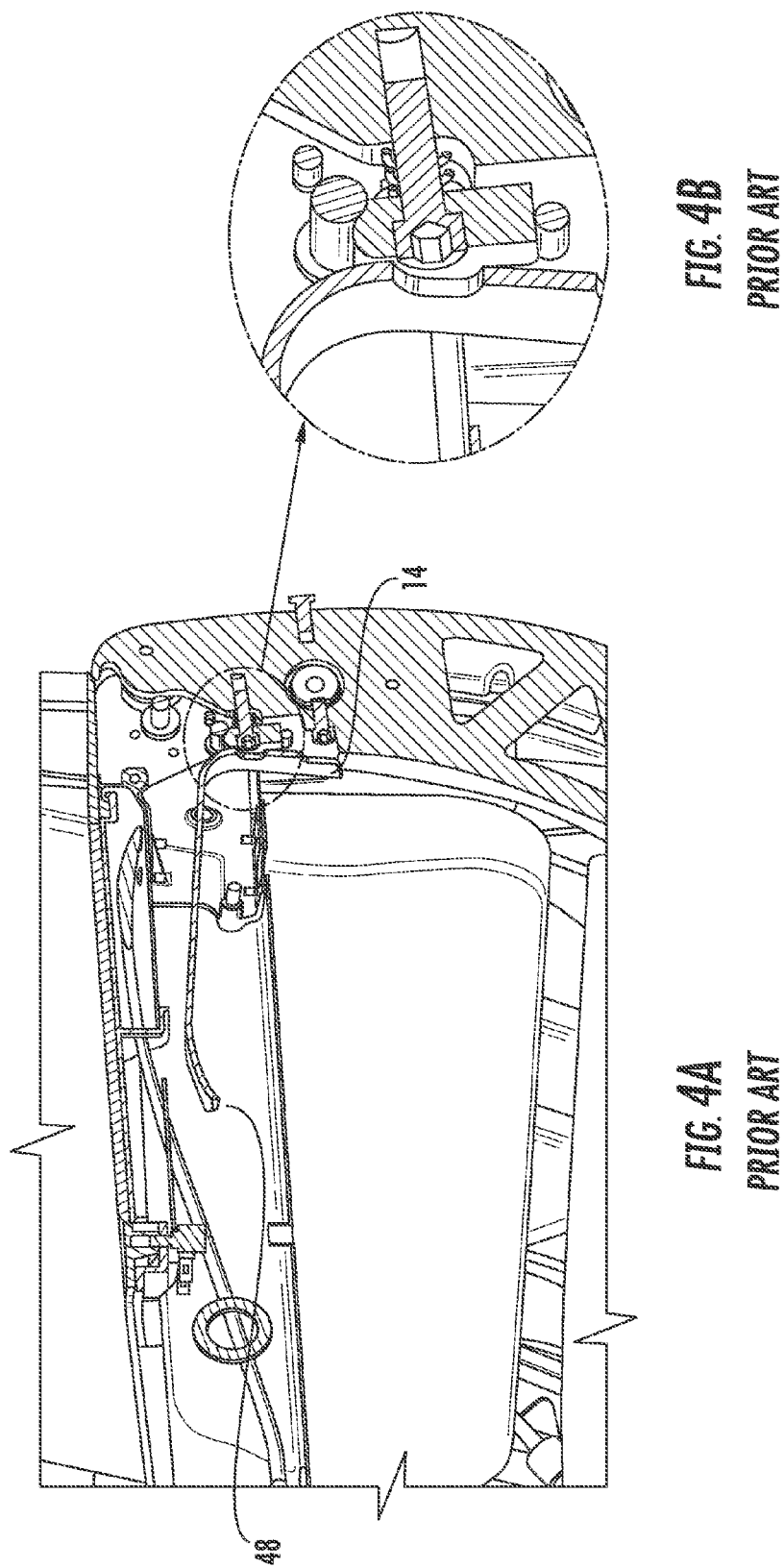
FIG. 4A is a perspective view of the pivotal coupling arrangement of FIG. 3A with a prior art close-out shroud.
FIG. 4B is a close-up perspective view of the prior art close-out shroud of FIG. 4A.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of close-out shrouds may be described with reference to an aircraft seat, they are by no means so limited. In fact, the close-out shrouds may be used in conjunction with any type of vehicle seat or otherwise as desired.

According to certain embodiments of the present invention, a close-out shroud 10 comprises an enclosure portion 12, a coupling portion 14, and at least one living hinge 16 positioned between the enclosure portion 12 and the coupling portion 14.

In certain embodiments, as shown in FIGS. 6-11, the living hinge 16 is a thin flexible hinge (or flexure bearing) that is formed as a thinned or cut section of material of an integrally formed piece. The living hinge 16 is shaped to allow the close-out shroud 10 to bend along a longitudinal axis of the living hinge 16.

Historically, plastic materials having suitable fatigue resistance qualities to be used to form living hinges 16 either (1) lacked the necessary flame retardant properties for use in regulated applications such as aircraft and the like and/or (2) the addition of the requisite flame retardant additives to the plastic material adversely impacted the fatigue resistance properties so that the material could no longer deliver the qualities needed to be used as a living hinge. As a result, the lack of suitable materials prevented the incorporation of living hinges with suitable mechanical properties into aircraft (or other applications with regulations governing flame retardant qualities of materials).

Recent improvements in available flame retardant plastic materials with the requisite fatigue resistance properties have enabled the successful use of living hinges 16 with close-out shrouds 10 in such regulated applications. For example, RTP Company now offers a polypropylene high flow flame retardant material (RTP 154 HF), which has improved physical properties, low specific gravity, and excellent moldability, as compared to traditional UL94 V-0 polypropylenes.

As a result, the living hinge 16 may be made from the same material as the enclosure portion 12 and the coupling portion 14 so that the entire close-out shroud 10 may be formed of a single integrally formed piece. In particular, the living hinge 16 (and in fact the entire close-out shroud 10) may be formed of flame retardant plastic materials, such as polyethylene and polypropylene, with excellent fatigue resistance. A person of ordinary skill in the relevant art will understand that other suitable materials having similar fatigue resistant and flame retardant properties may be used. In certain embodiments, any high melt flow flame retardant material may be used, wherein a high melt flow rate (wherein melt flow rate is defined by ASTM D 1238) is greater than 2 g/10 min, and may further be greater than 5 g/10 min, and may yet further be greater than 10 g/10 min, and may yet further be greater than 20 g/10 min, and may yet further be greater than 30 g/10 min.

Ideally, the close-out shroud 10 may be made from any flame retardant material that allows for robust and extensive number of bending cycles, such as spring steel or machined materials with appropriate hinge mechanisms.

In certain embodiments, the close-out shroud 10 may be configured to substantially enclose an articulating opening to a cavity or void. For example, such cavities or voids may have a shape that changes due to relative mating positions between components, such as cavities or voids formed between articulating components like arm rests, foot rests, tray tables, back rests, displays, leg rests, or other similar types of translating or moving components that may pose a hazard to passengers or may need to be otherwise blocked from passenger access or tampering. In these embodiments, the living hinge 16 is configured to adapt a shape of the close-out shroud 10 to the articulating opening of the cavity or void.

Figure 10:
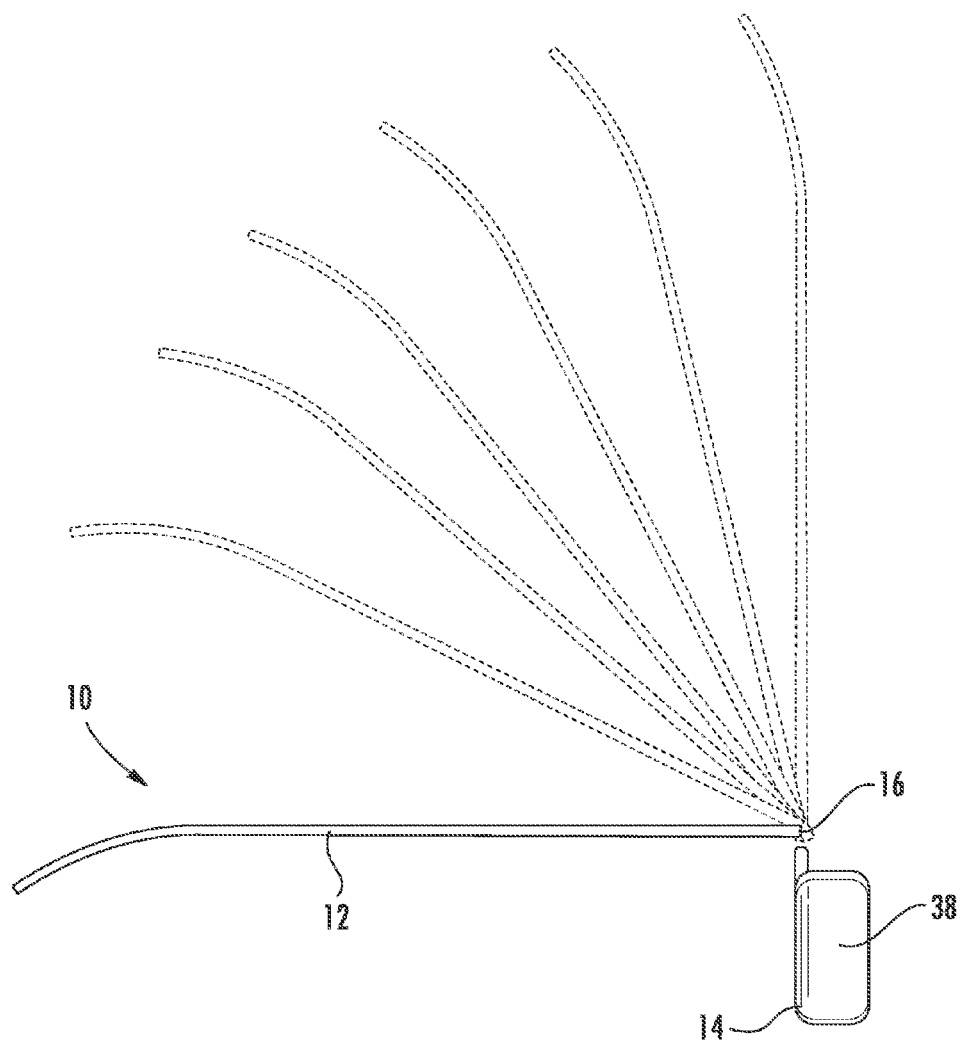
FIG. 10 is a side view showing an articulating motion of the living hinge in the close-out shroud of FIG. 6, according to certain embodiments of the present invention.
Figure 11:
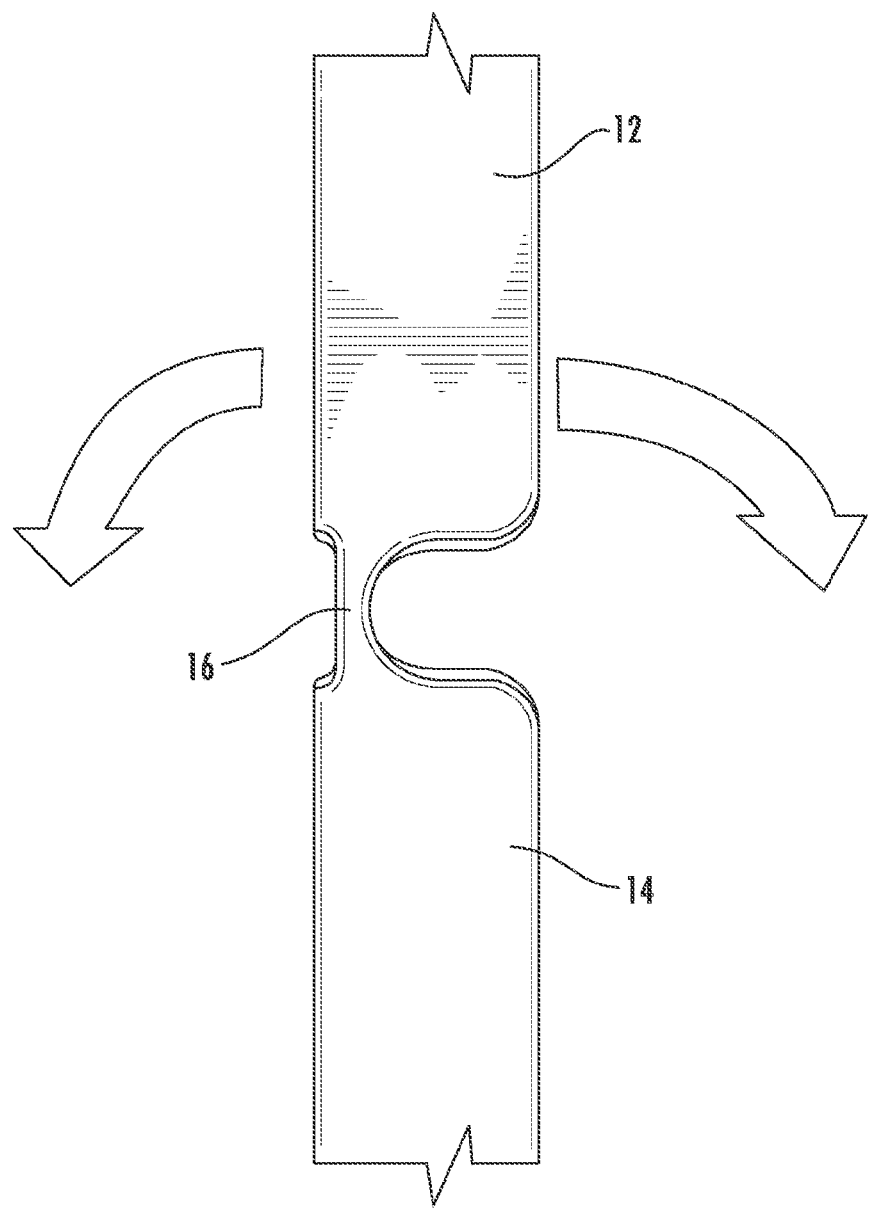
FIG. 11 is a close-up side view showing an articulating motion of the living hinge in the close-out shroud of FIG. 6, according to certain embodiments of the present invention.

FIGS. 10-11 illustrate the bending motion of the living hinge 16 within the close-out shroud 10. The living hinge 16 is configured to articulate over a large number of cycles without breaking. For example, the living hinge 16 may have a high fatigue resistance, wherein a high fatigue resistance is defined as articulating through greater than 40,000 cycles before failure, and may further be defined as articulating through greater than 50,000 cycles before failure, and may yet further be defined as articulating through greater than 75,000 cycles before failure, and may yet further be defined as articulating through greater than 100,000 cycles before failure.

During standard performance testing of the close-out shroud 10 made from high flow flame retardant polypropylene (RTP 154 HF) to 75,000 cycles, there was no noted fatigue or performance degradation to any portion of the living hinge 16. In contrast, standard performance testing of close-out shrouds made from flame retardant polycarbonate failed after 20,000 cycles.

While the close-out shroud 10 illustrated in FIGS. 6-11 indicates the presence of one living hinge 16, any suitable number of a plurality of living hinges 16 may be used as needed or desired to achieve the appropriate flexibility and movement of the close-out shroud 10 based on mechanical movements of the associated area to be enclosed.

With respect to the specific application to the arm rests 22, as described above and as illustrated in FIGS. 1-3B and 6-8B, the close-out shroud 10 is configured for use with an arm rest assembly 20 of a passenger seat 18. In certain embodiments, the arm rest assembly 20 comprises an arm rest 22, wherein an aft end 26 of the arm rest 22 is pivotally coupled to an upper end 28 of a spreader assembly 24 (which forms a portion of the passenger seat frame) at a pivot location 30. The pivot location 30 is shaped so that the arm rest 22 may rotate between a substantially vertical (or stowed) position, and a substantially horizontal (or deployed) position.

The arm rest 22 is supported in the deployed position by an adjustable cam 32, which is mounted to the spreader assembly 24. Specifically, an arm rest pivot pin 34 is coupled to the arm rest 22 adjacent the pivot location 30 in a position where the arm rest pivot pin 34 will contact the cam 32 when the arm rest 22 reaches the deployed position.

The height and angle of the deployed position of the arm rest 22 may be adjusted by loosening or tightening a set screw 36 that couples the cam 32 to the spreader assembly 24. For example, the upper surface of the cam 32 may be angled so that the vertical height of the portion of the cam 32 that contacts the pivot pin 34 may be adjusted by moving the cam 32 forward/aft relative to the spreader assembly 24 via the set screw 36.

Because the pivot pin 34 rests directly on the cam 32 in the deployed position, the close-out shroud 10 is coupled to the arm rest 22 and the spreader assembly 24 and is configured to enclose the space between the pivot pin 34 and the cam 32 over the range of motion of the arm rest 22 between deployed and stowed positions.

To couple the close-out shroud 10 to the spreader assembly 24, the coupling portion 14 comprises a pair of prongs 38. In some embodiments, each prong 38 is configured to fit around a side of the spreader assembly 24 proximate an aperture 40 in the spreader assembly 24. In some embodiments, the prongs 38 may be coupled to and existing aperture 40 in the spreader assembly 24 via a pair of snap-fit hooks 42 positioned in an inner surface 44 of each prong 38, as shown in FIG. 6-9E. With a snap-fit coupling design, no tools are needed to install the close-out shroud 10.

Figure 5C:
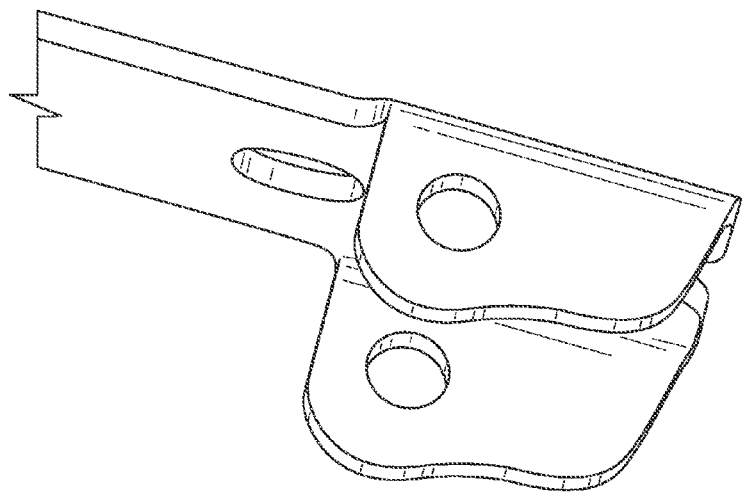
FIG. 5C is a close-up interior perspective view of the prior art close-out shroud of FIG. 4A.
Figure 5B:
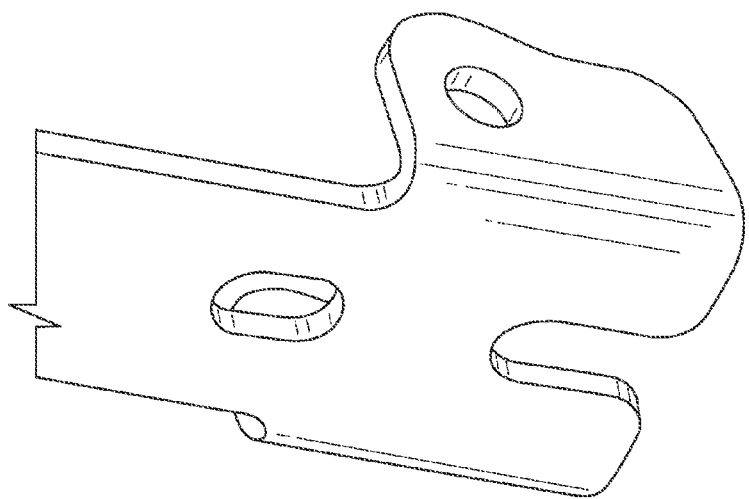
FIG. 5B is a close-up exterior perspective view of the prior art close-out shroud of FIG. 4A.
Figure 5A:
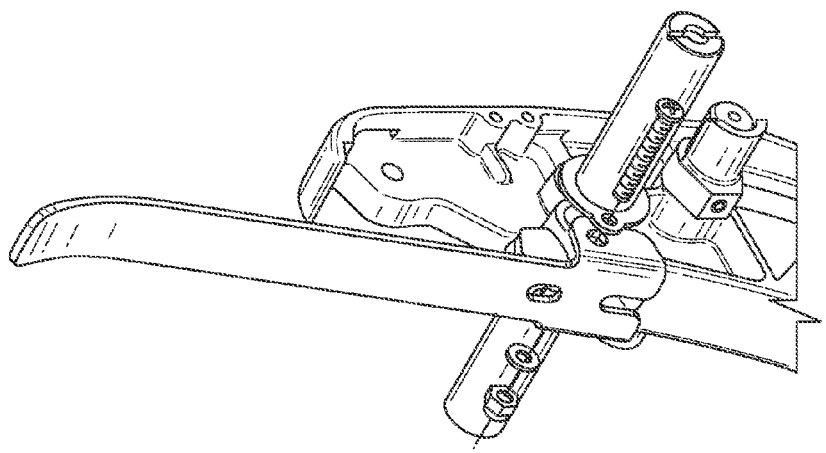
FIG. 5A is another perspective view of the prior art close-out shroud of FIG. 4A coupled to the spreader assembly of FIG. 3A.
Figure 6:
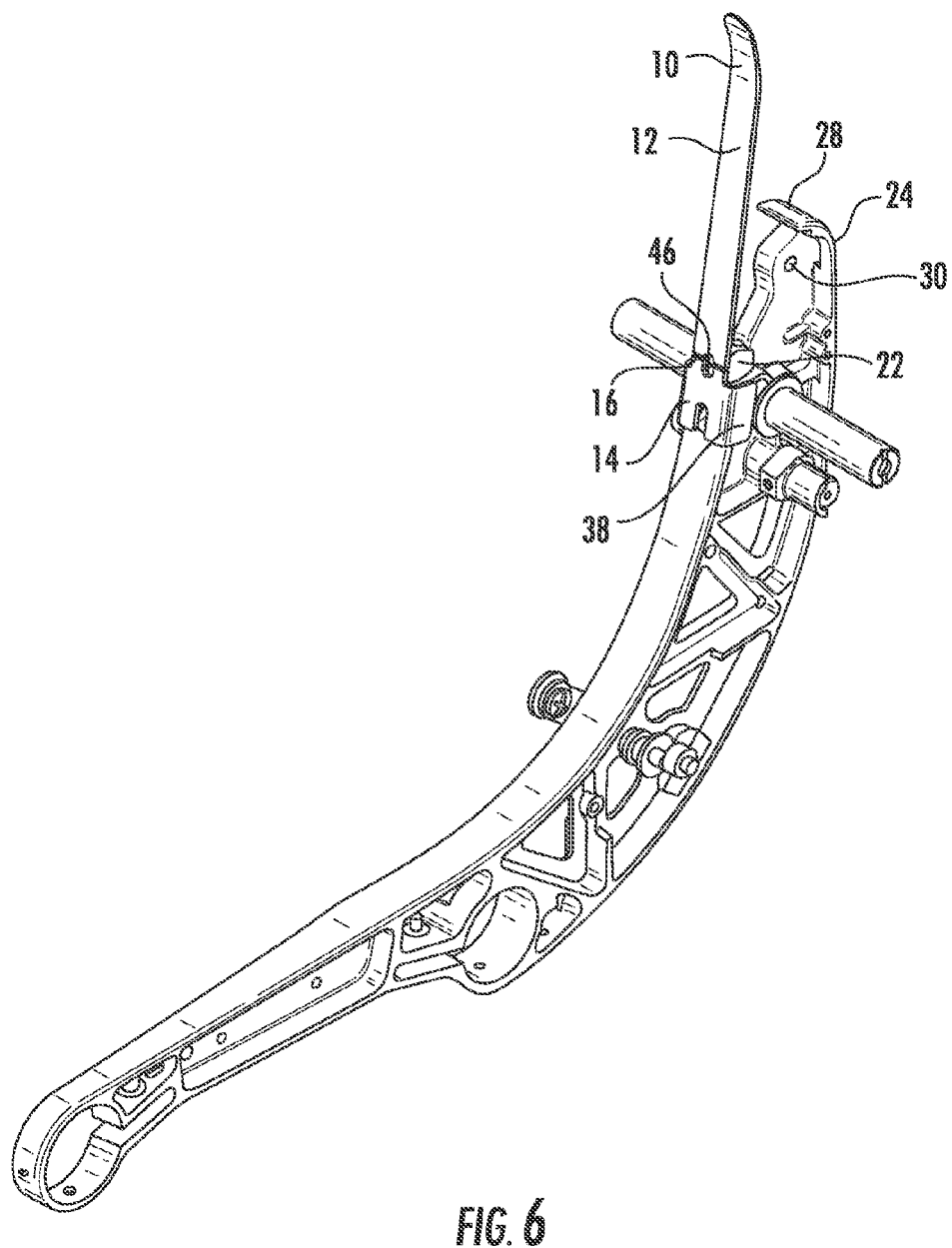
FIG. 6 is a perspective view of a close-out shroud coupled to the spreader assembly of FIG. 3A, according to certain embodiments of the present invention.
Figures 8A, 8B:
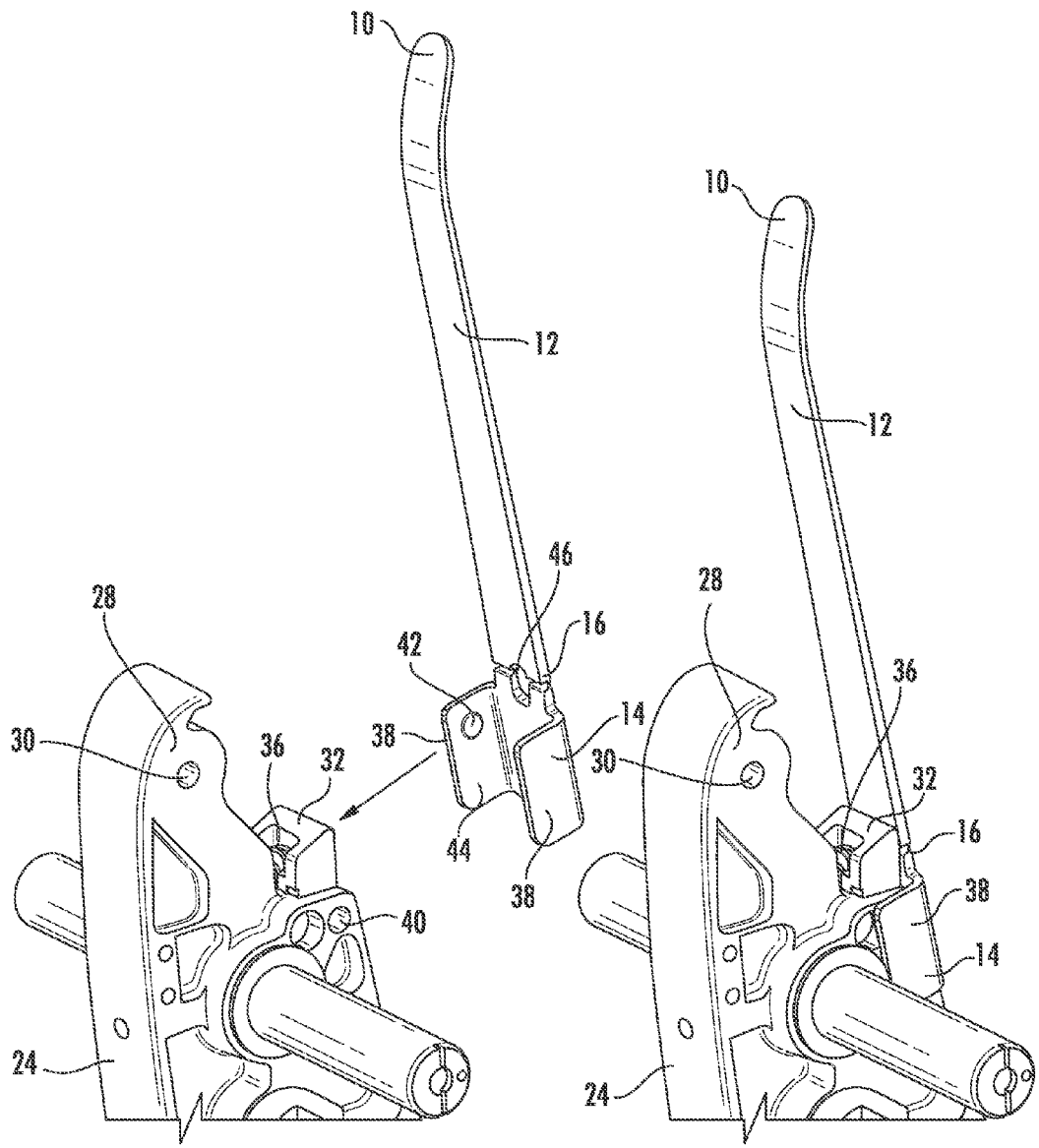
FIG. 8A is an exploded perspective view of the close-out shroud of FIG. 6 and the spreader assembly of FIG. 3A, according to certain embodiments of the present invention.
FIG. 8B is a coupled perspective view of the close-out shroud of FIG. 6 and the spreader assembly of FIG. 3A, according to certain embodiments of the present invention.
Figure 9A:
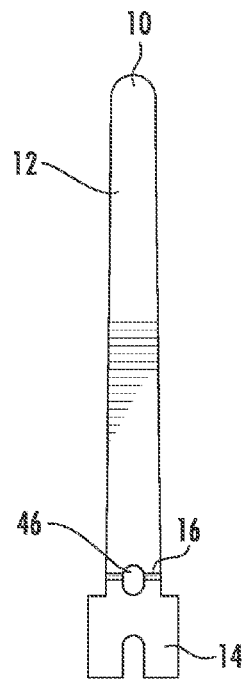
FIGS. 9A-9E are various orthogonal views of the close-out shroud of FIG. 6, according to certain embodiments of the present invention.
Figure 9B:
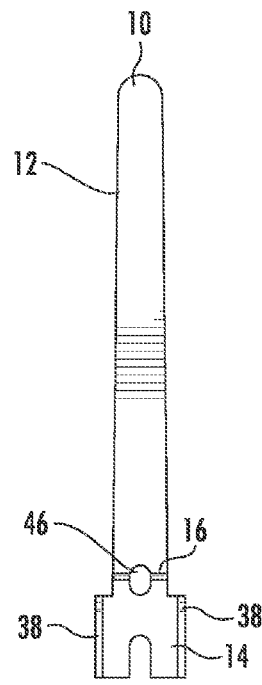
Figure 9C:
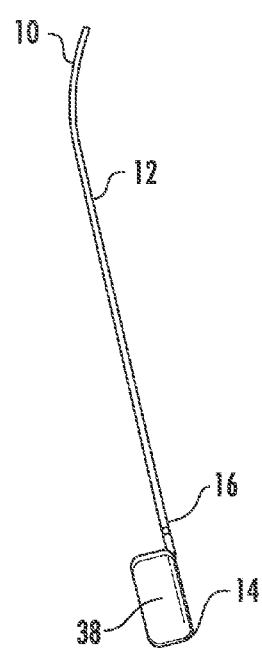
Figure 9D:
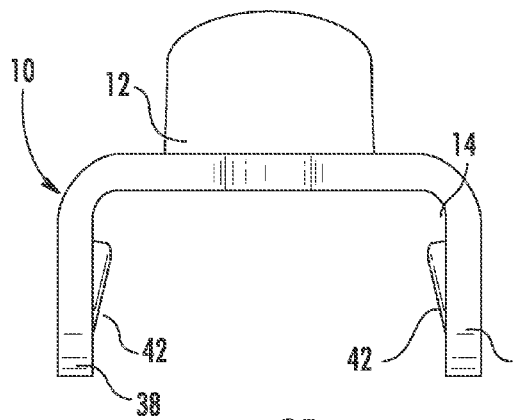
Figure 9E:
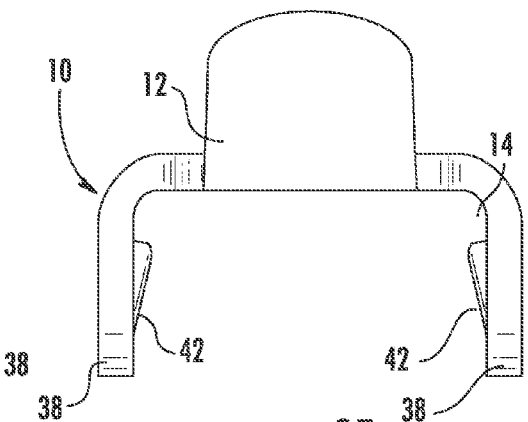

In other embodiments, as shown in FIGS. 5A-5C, the close-out shroud 10 may be coupled to the existing aperture 40 in the spreader assembly 24 via a conventional fastener (and associated apertures in the prongs 38).

The coupling portion 14 is coupled to the spreader assembly 24 in a location that allows the living hinge 16 to be positioned at the approximate location where the close-out shroud is bent by the downward rotation of the arm rest 22. In certain embodiments, this location may, but not necessarily, substantially coincide with the location of the upper surface of the cam 32 so that the living hinge 16 is substantially aligned with the set screw 36. As a result, an aperture 46 may be positioned through a portion of the living hinge 16 to allow access for adjustment of the set screw 36 as needed for adjusting the height and/or angle of the arm rest 22 in the deployed position.

The enclosure portion 12 then extends from the living hinge 16 into a lower region 48 of the arm rest 22. The enclosure portion 12 may have an elongated shape to distribute the bending force applied by the arm rest 22, and has a lateral shape that is configured to ensure that the pinch point between the pivot pin 34 and the cam 32 is blocked from access by a passenger.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A passenger seat comprising:
a spreader assembly;
an arm rest assembly pivotally coupled to the spreader assembly;
a close-out shroud comprising:
a flame retardant material with a fatigue resistance that exceeds 50,000 cycles before failure; and
at least one living hinge formed within the flame retardant material;
wherein the close-out shroud is coupled to the arm rest assembly and the spreader assembly so that the at least one living hinge is positioned to articulate with the pivotal movement of the arm rest assembly over an entire range of motion of the arm rest assembly.

2. The passenger seat of claim 1, wherein the at least one living hinge is formed as a thinned or cut section of the flame retardant material.

3. The passenger seat of claim 1, wherein the flame retardant material is polypropylene or polyethylene.

4. The passenger seat of claim 1, wherein the flame retardant material has a high melt flow rate greater than 2 g/10 min.

5. The passenger seat of claim 1, wherein the fatigue resistance exceeds 75,000 cycles before failure.

6. The passenger seat of claim 1, wherein the flame retardant material comprises a plurality of living hinges.

7. The passenger seat of claim 1, wherein the flame retardant material comprises a pair of prongs with snap-fit hooks to couple the close-out shroud to the spreader assembly.

8. A passenger seat comprising:
a spreader assembly comprising a cam;
an arm rest assembly comprising a pivot pin;
wherein the arm rest assembly is pivotally coupled to the spreader assembly;
a close-out shroud comprising:
a flame retardant material comprising at least one living hinge;
wherein the close-out shroud is coupled to the arm rest assembly and the spreader assembly;
wherein the close-out shroud substantially encloses a location where the arm rest assembly is supported in a deployed position by the spreader assembly such that the pivot pin rests on the cam; and
wherein the at least one living hinge is configured to articulate through greater than 50,000 cycles before failure.

9. The passenger seat of claim 8, wherein the at least one living hinge is formed as a thinned or cut section of the flame retardant material.

10. The passenger seat of claim 8, wherein the flame retardant material is polypropylene or polyethylene.

11. The passenger seat of claim 8, wherein the flame retardant material has a high melt flow rate greater than 2 g/10 min.

12. The passenger seat of claim 8, wherein the flame retardant material comprises a plurality of living hinges.

13. The passenger seat of claim 8, wherein the flame retardant material comprises a pair of prongs with snap-fit hooks to couple the close-out shroud to the spreader assembly.

14. The passenger seat of claim 8, wherein an adjustable cam attached to the spreader assembly supports the arm rest assembly in the deployed position.

15. A passenger seat comprising:
a spreader assembly comprising a cam;
an arm rest assembly comprising an arm rest and a pivot pin, wherein the arm rest is pivotally coupled to the spreader assembly and configured to rotate between a stowed and a deployed position, wherein the pivot pin contacts the cam when the arm rest is in the deployed position; and
a close-out shroud comprising
an enclosure portion;
a coupling portion; and
at least one living hinge positioned between the enclosure portion and the coupling portion;
wherein the coupling portion is coupled to the spreader assembly and the enclosure portion extends into the arm rest so that the at least one living hinge is configured to articulate with the pivotal movement of the arm rest so that the close-out shroud substantially encloses an articulating opening between the pivot pin and the cam.

16. The passenger seat of claim 15, wherein the at least one living hinge is formed as a thinned or cut section of a flame retardant material forming both the enclosure portion and the coupling portion.

17. The passenger seat of claim 16, wherein the flame retardant material is polypropylene or polyethylene.

18. The passenger seat of claim 15, wherein the at least one living hinge is configured to articulate through greater than 50,000 cycles before failure.

19. The passenger seat of claim 15, wherein the coupling portion comprises a pair of prongs with snap-fit hooks that couple the close-out shroud to the spreader assembly.

* * * * *